US010405221B2

(12) United States Patent
Luo et al.

(10) Patent No.: US 10,405,221 B2
(45) Date of Patent: Sep. 3, 2019

(54) UPLINK MULTI-USER MULTI-INPUT MULTI-OUTPUT ESTABLISHMENT METHOD AND APPARATUS

(71) Applicant: HUAWEI TECHNOLOGIES CO., LTD., Shenzhen, Guangdong (CN)

(72) Inventors: Yi Luo, Shenzhen (CN); Xun Yang, Shenzhen (CN); Yingpei Lin, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 182 days.

(21) Appl. No.: 15/357,816

(22) Filed: Nov. 21, 2016

(65) Prior Publication Data

US 2017/0070906 A1 Mar. 9, 2017

Related U.S. Application Data

(63) Continuation of application No. PCT/CN2014/078918, filed on May 30, 2014.

(51) Int. Cl.
*H04W 24/10* (2009.01)
*H04W 76/40* (2018.01)
(Continued)

(52) U.S. Cl.
CPC .......... *H04W 24/10* (2013.01); *H04B 7/0452* (2013.01); *H04J 13/00* (2013.01);
(Continued)

(58) Field of Classification Search
CPC . H04W 24/10; H04W 76/40; H04W 72/1205; H04W 72/1278; H04W 74/002;
(Continued)

(56) References Cited

U.S. PATENT DOCUMENTS

2011/0039568 A1* 2/2011 Zhang .................. H04W 52/50 455/452.1
2011/0090855 A1 4/2011 Kim
(Continued)

FOREIGN PATENT DOCUMENTS

CN 102237920 A 11/2011
CN 102238641 A 11/2011
(Continued)

OTHER PUBLICATIONS

IEEE Standards Association, "Part 11: Wireless LAN Medium Access Control (MAC) and Physical Layer (PHY) Specifications," IEEE Computer Society, Mar. 29, 2012.
(Continued)

*Primary Examiner* — Pao Sinkantarakorn
*Assistant Examiner* — Stephen N Steiner
(74) *Attorney, Agent, or Firm* — Womble Bond Dickinson (US) LLP

(57) ABSTRACT

An uplink multi-user multi-input multi-output establishment method includes broadcasting, by a network side device, an uplink data sending announcement; receiving buffer information sent by a terminal that needs to send data, where the buffer information includes at least a sending level and a data sending length of to-be-sent data; determining, according to the buffer information, scheduling information for establishing uplink multi-user multi-input multi-output; and sending, to a terminal that is allowed to send data and selected from the terminal that needs to send data, a clear to send frame that carries the scheduling information, so that the terminal that is allowed to send data sends the to-be-sent data according to the scheduling information. The embodiments of the present disclosure effectively implement uplink multi-user multi-input multi-output establishment, so that
(Continued)

signaling interworking is reduced, resource overheads are reduced, and data sending efficiency is improved.

18 Claims, 3 Drawing Sheets

(51) Int. Cl.
*H04B 7/0452* (2017.01)
*H04J 13/00* (2011.01)
*H04L 27/26* (2006.01)
*H04W 72/12* (2009.01)
*H04W 74/08* (2009.01)
*H04W 74/00* (2009.01)

(52) U.S. Cl.
CPC ..... *H04L 27/2601* (2013.01); *H04W 72/1205* (2013.01); *H04W 72/1278* (2013.01); *H04W 74/002* (2013.01); *H04W 74/0816* (2013.01); *H04W 76/40* (2018.02)

(58) Field of Classification Search
CPC .. H04W 74/0816; H04B 7/0452; H04J 13/00; H04L 27/2601
See application file for complete search history.

(56) References Cited

U.S. PATENT DOCUMENTS

| | | | | |
|---|---|---|---|---|
| 2011/0268054 | A1 | 11/2011 | Abraham et al. | |
| 2013/0301551 | A1 | 11/2013 | Ghosh et al. | |
| 2014/0301383 | A1* | 10/2014 | Sohn | H04B 7/0452 370/338 |
| 2015/0063258 | A1* | 3/2015 | Merlin | H04L 47/12 370/329 |

FOREIGN PATENT DOCUMENTS

| | | | |
|---|---|---|---|
| CN | 102792755 | A | 11/2012 |
| WO | 2011/112741 | A1 | 9/2011 |

OTHER PUBLICATIONS

EP Application No. 14893637.0, Extended European Search Report, dated May 29, 2017.

PCT/CN2014/078918, International Search Report, dated Feb. 27, 2015.

Tandai, Tomoya, et al, "An Efficient Uplink Multiuser MIMO Protocol in IEEE 802.11 WLANS," 2009 IEEE 20th International Symposium on Personal, Indoor and Mobile Radio Communications, Sep. 13-16, 2009.

Jung, Daewon, "Opportunistic MAC Protocol for Coordinating Simultaneous Transmissions in Multi-User MIMO Based WLANs," IEEE Communications Letters, vol. 15, No. 8, Aug. 2011.

Jin, Hu, "Performance Comparison of Uplink WLANs with Single-user and Multi-user MIMO Schemes," IEEE Wireless Communications and Networking Conference, 2008, Mar. 31-Apr. 3, 2008.

Huawei, HiSilicon, "Discussion on SR for D2D communication," 3GPP TSG RAN WG2 Meeting #86, May 19-23, 2014.

Van Nee, Richard, "UL MU-MIMO for 11ac," IEEE, Jul. 2009.

3GPP TS 25.319, "3rd Generation Partnership Project; Technical Specification Group Radio Access Network; Enhanced Uplink; Overall Description," Stage 2, Release 11, Dec. 2013.

3GPP TR 36.814, "3rd Generation Partnership Project; Technical Specification Group Radio Access Network; Further Advancements for E-UTRA Physical Layer Aspects," Release 9, Feb. 2010.

International Search Report for International Application No. PCT/CN2014/078918, dated Feb. 27, 2015, 4 pages.

* cited by examiner

UPLINK MULTI-USER MULTI-INPUT MULTI-OUTPUT ESTABLISHMENT METHOD AND APPARATUS

CROSS-REFERENCE TO RELATED APPLICATIONS

This application is a continuation of International Application No. PCT/CN2014/078918, filed on May 30, 2014, the disclosure of which is hereby incorporated by reference in its entirety.

TECHNICAL FIELD

The present application relates to the field of network technologies, and in particular, to an uplink multi-user multi-input multi-output establishment method and apparatus.

BACKGROUND

Uplink multi-user multi-input multi-output (UL MU-MIMO) refers to a data sending manner in which multiple terminals synchronously send uplink data to a network side device.

To establish UL MU-MIMO, the network side device needs to obtain related information about to-be-sent data of the terminals, such as a data sending level and a data sending length, so as to determine scheduling information for establishing UL MU-MIMO. The terminals can implement UL MU-MIMO only by sending the to-be-sent data according to the scheduling information.

SUMMARY

In view of this, the present application provides uplink multi-user multi-input multi-output establishment method and apparatus, which effectively implement uplink multi-user multi-input multi-output establishment, reduce resource overheads, and improve data sending efficiency.

To achieve the foregoing objectives, the present application provides the following technical solutions:

According to a first aspect, an uplink multi-user multi-input multi-output establishment method is provided, including:

broadcasting, by a network side device, an uplink data sending announcement;

receiving buffer information sent by a terminal that needs to send data, where the buffer information includes at least a sending level and a data sending length of to-be-sent data;

determining, according to the buffer information, scheduling information for establishing uplink multi-user multi-input multi-output; and selecting, from the terminal that needs to send data, a terminal that is allowed to send data, and sending, to the terminal that is allowed to send data, a clear to send frame that carries the scheduling information, so that the terminal that is allowed to send data sends the to-be-sent data according to the scheduling information.

In a first possible implementation manner of the first aspect, the receiving buffer information sent by a terminal that needs to send data includes:

receiving the buffer information synchronously sent by the terminal that needs to send data.

In a second possible implementation manner of the first aspect, the receiving buffer information sent by a terminal that needs to send data includes:

receiving the buffer information that is sent, in an Orthogonal Frequency Division Multiple Access resource block allocated by the network side device, by the terminal that needs to send data.

In a third possible implementation manner of the first aspect, the receiving buffer information sent by a terminal that needs to send data includes:

receiving the buffer information that is sent, in an orthogonal sequence, a quasi-orthogonal sequence, or a Code Division Multiple Access sequence and in an Orthogonal Frequency Division Multiple Access resource block allocated by the network side device, by the terminal that needs to send data.

With reference to any one of the first aspect or the foregoing possible implementation manners of the first aspect, a fourth possible implementation manner of the first aspect is further provided, where after the broadcasting, by a network side device, an uplink data sending announcement, the method further includes:

receiving a request to send frame sent by the terminal that needs to send data.

With reference to any one of the first aspect or the foregoing possible implementation manners of the first aspect, a fifth possible implementation manner of the first aspect is further provided, where the buffer information further includes a backoff timer value.

According to a second aspect, an uplink multi-user multi-input multi-output establishment method is provided, including:

receiving, by a terminal, an uplink data sending announcement sent by a network side device;

sending buffer information to the network side device when determining that data needs to be sent, where the buffer information includes at least a sending level and a data sending length of to-be-sent data; and when receiving a clear to send frame that carries scheduling information and is sent by the network side device, sending the to-be-sent data to the network side device according to the scheduling information, where the scheduling information is determined by the network side device according to the buffer information.

In a first possible implementation manner of the second aspect, the sending buffer information to the network side device when determining that data needs to be sent includes:

when determining that data needs to be sent, sending the buffer information in an Orthogonal Frequency Division Multiple Access resource block allocated by the network side device.

In a second possible implementation manner of the second aspect, the sending buffer information to the network side device when determining that data needs to be sent includes:

when determining that data needs to be sent, sending the buffer information in an orthogonal sequence, a quasi-orthogonal sequence, or a Code Division Multiple Access sequence and in an Orthogonal Frequency Division Multiple Access resource block allocated by the network side device.

With reference to any one of the second aspect or the foregoing possible implementation manners of the second aspect, a third possible implementation manner of the second aspect is further provided, where the method further includes:

sending a request to send frame to the network side device.

According to a third aspect, an uplink multi-user multi-input multi-output establishment apparatus applied to a network side device is provided, where the apparatus includes:

a first sending module, configured to broadcast an uplink data sending announcement;

an information receiving module, configured to receive buffer information sent by a terminal that needs to send data, where the buffer information includes at least a sending level and a data sending length of to-be-sent data;

an information determining module, configured to determine, according to the buffer information, scheduling information for establishing uplink multi-user multi-input multi-output; and a second sending module, configured to select, from the terminal that needs to send data, a terminal that is allowed to send data, and send, to the terminal that is allowed to send data, a clear to send frame that carries the scheduling information, so that the terminal that is allowed to send data sends the to-be-sent data according to the scheduling information.

In a first possible implementation manner of the third aspect, the information receiving module is specifically configured to receive the buffer information synchronously sent by the terminal that needs to send data.

In a second possible implementation manner of the third aspect, the information receiving module is specifically configured to receive the buffer information that is sent, in an Orthogonal Frequency Division Multiple access resource block allocated by the network side device, by the terminal that needs to send data.

In a third possible implementation manner of the third aspect, the information receiving module is specifically configured to receive the buffer information that is sent, in an orthogonal sequence, a quasi-orthogonal sequence, or a Code Division Multiple Access sequence and in an Orthogonal Frequency Division Multiple Access resource block allocated by the network side device, by the terminal that needs to send data.

With reference to any one of the third aspect or the foregoing possible implementation manners of the third aspect, a fourth possible implementation manner of the third aspect is further provided, where the information receiving module is further configured to receive a request to send frame sent by the terminal that needs to send data.

According to a fourth aspect, a network side device is provided, including a memory, a transmitter, a receiver, and a processor, where the memory stores a set of program instructions; and the processor is configured to invoke the program instructions stored in the memory, so as to execute the following operations:

broadcasting an uplink data sending announcement by using the transmitter;

receiving, by using the receiver, buffer information sent by a terminal that needs to send data, where the buffer information includes at least a sending level and a data sending length of to-be-sent data; and determining, according to the buffer information, scheduling information for establishing uplink multi-user multi-input multi-output; and selecting, from the terminal that needs to send data, a terminal that is allowed to send data, and sending, by using the transmitter to the terminal that is allowed to send data, a clear to send frame that carries the scheduling information, so that the terminal that is allowed to send data sends the to-be-sent data according to the scheduling information.

According to a fifth aspect, an uplink multi-user multi-input multi-output establishment apparatus applied to a terminal is provided, where the apparatus includes:

an announcement receiving module, configured to receive an uplink data sending announcement sent by a network side device;

an information sending module, configured to send buffer information to the network side device when determining that data needs to be sent, where the buffer information includes at least a sending level and a data sending length of to-be-sent data; and a data sending module, configured to: when receiving a clear to send frame that carries scheduling information and is sent by the network side device, send the to-be-sent data to the network side device according to the scheduling information, where the scheduling information is determined by the network side device according to the buffer information.

In a first possible implementation manner of the fifth aspect, the information sending module is specifically configured to: when determining that data needs to be sent, send the buffer information in an Orthogonal Frequency Division Multiple access resource block allocated by the network side device.

In a second possible implementation manner of the fifth aspect, the information sending module is specifically configured to: when determining that data needs to be sent, send the buffer information in an orthogonal sequence, a quasi-orthogonal sequence, or a Code Division Multiple Access sequence and in an Orthogonal Frequency Division Multiple Access resource block allocated by the network side device.

With reference to any one of the fifth aspect or the foregoing possible implementation manners of the fifth aspect, the information sending module is further configured to send a request to send frame to the network side device when determining that data needs to be sent.

According to a sixth aspect, a terminal is provided, including a memory, a transmitter, a receiver, and a processor, where the memory stores a set of program instructions; and the processor is configured to invoke the program instructions stored in the memory, so as to execute the following operations:

receiving, by using the receiver, an uplink data sending announcement sent by a network side device;

sending, by using the transmitter, buffer information to the network side device when determining that data needs to be sent, where the buffer information includes at least a sending level and a data sending length of to-be-sent data; and when receiving a clear to send frame that carries scheduling information and is sent by the network side device, sending, by using the transmitter, the to-be-sent data to the network side device according to the scheduling information, where the scheduling information is determined by the network side device according to the buffer information.

It may be learned from the foregoing technical solutions that, compared with the prior art, the present application provides uplink multi-user multi-input multi-output establishment method and apparatus. A network side device broadcasts an uplink multi-user multi-input multi-output announcement, which indicates a start of uplink access. After receiving the uplink multi-user multi-input multi-output announcement and when determining that data needs to be sent, a terminal sends buffer information that includes at least a sending level and a data size of to-be-sent data to the network side device. The network side device may obtain the sending level and a data sending length of the to-be-sent data according to the buffer information, and therefore may determine scheduling information for establishing uplink multi-user multi-input multi-output. The network side device sends the scheduling information to a terminal that is allowed to send data. The terminal that is allowed to send data may send the to-be-sent data according to the scheduling information, thereby implementing the uplink multi-user multi-input multi-output establishment. The terminal directly feeds back the buffer information that includes the sending level and the data sending length of the to-be-sent data to the network side device, and there is no need to perform multiple times of signaling interworking between the terminal and the network side device, so that signaling interworking is reduced. Therefore, resource overheads may be reduced, data sending efficiency is improved, and effective establishment of uplink multi-user multi-input multi-output is implemented.

BRIEF DESCRIPTION OF DRAWINGS

To describe the technical solutions in the embodiments of the present disclosure more clearly, the following briefly describes the accompanying drawings for describing the embodiments. Apparently, the accompanying drawings in the following description show merely some embodiments of the present disclosure, and a person of ordinary skill in the art may still derive other drawings from the provided accompanying drawings without creative efforts.

DESCRIPTION OF EMBODIMENTS

The following clearly describes the technical solutions in the embodiments of the disclosure with reference to the accompanying drawings in the embodiments of the disclosure. Apparently, the described embodiments are merely some but not all of the embodiments of the disclosure. All other embodiments obtained by a person of ordinary skill in the art based on the embodiments of the disclosure without creative efforts shall fall within the protection scope of the embodiments of the disclosure.

The technical solutions provided by the embodiments of the disclosure may be applied to various communications systems, such as a Long Term Evolution (LTE) system and a wireless local area network (WLAN) system.

A terminal may also be referred to as user equipment (UE), a user terminal (UT), a mobile terminal (MT), a mobile station (MS), and the like.

A network side device mainly refers to a wireless access point in an unlicensed frequency band, for example, an AP (AP) in a WLAN, or may be a coordination point in a network of an unlicensed frequency band, where the coordination point undertakes coordination and control between terminals within a specific range, or may be a network side device in LTE in an unlicensed frequency spectrum (e.g., a Long Term Evolution-Unlicensed, LTE-U).

In the embodiments of the disclosure, a network side device broadcasts an uplink multi-user multi-input multi-output announcement, which indicates a start of uplink access. After receiving the uplink multi-user multi-input multi-output announcement and when determining that data needs to be sent, a terminal sends buffer information that includes at least a sending level and a data size of to-be-sent data to the network side device. The network side device may obtain the sending level and a data sending length of the to-be-sent data according to the buffer information, and therefore may determine scheduling information for establishing uplink multi-user multi-input multi-output. The network side device sends the scheduling information to a terminal that is allowed to send data. The terminal that is allowed to send data may send the to-be-sent data according to the scheduling information, thereby implementing uplink multi-user multi-input multi-output establishment. The terminal directly feeds back the buffer information that includes the sending level and the data sending length of the to-be-sent data to the network side device, and there is no need to perform multiple times of signaling interworking, so that signaling interworking is reduced. In addition, the network side device may use a multicast manner to uniformly send scheduling information, which further reduces signaling interworking, so that resource overheads may be reduced, data sending efficiency is improved, and effective establishment of uplink multi-user multi-input multi-output is implemented.

Figure 1:
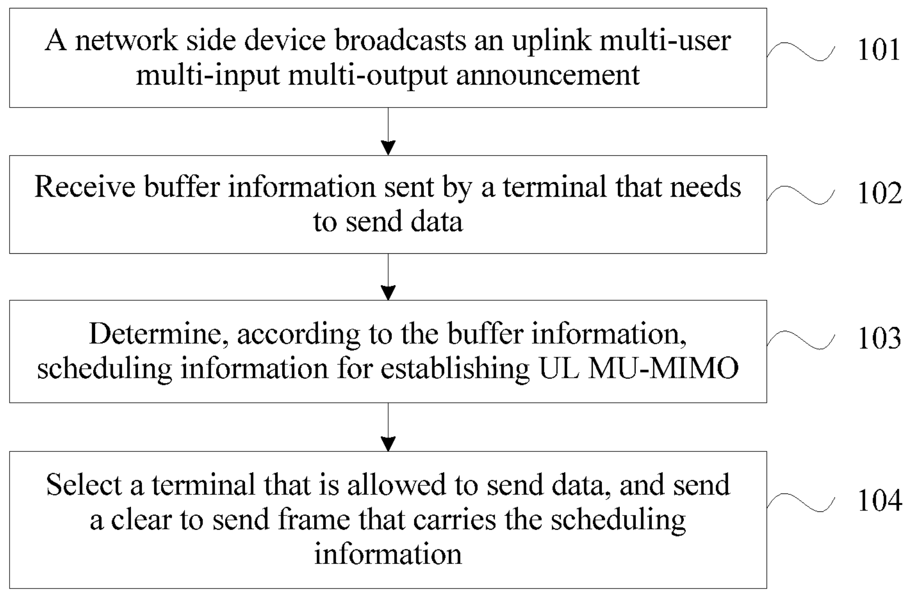
FIG. 1 is a flowchart of an uplink multi-user multi-input multi-output establishment method according to an embodiment of the disclosure.

FIG. 1 is a flowchart of an uplink multi-user multi-input multi-output (UL MU-MIMO) establishment method according to an embodiment of the disclosure, where the method may include the following several operations:

101. A network side device broadcasts an uplink multi-user multi-input multi-output announcement (UMA).

102. Receive buffer information sent by a terminal that needs to send data, where the buffer information includes at least a sending level and a data sending length of to-be-sent data.

The UMA is used to initiate an uplink multi-user access, and is a start of the uplink multi-user access.

The UMA may carry a first network allocation vector (NAV) value, where the first NAV value specifies a time length that needs to be occupied to send the UMA. After receiving the UMA, a terminal performs, according to the first NAV value, no other service processing in the time length specified by the first NAV value, so as to protect a processing process of the UMA.

The UMA may further carry an application identifier (AID) of the network side device, a feedback location information, and the like.

After receiving the UMA, the terminal may determine whether data needs to be sent, and may send buffer information to the network side device if data needs to be sent. The buffer information includes at least a sending level and a data sending length of to-be-sent data, where the data sending length indicates a data length of the to-be-sent data, and the sending level indicates an access priority of the to-be-sent data. To-be-sent data of a relatively high sending level may be preferentially accessed.

The buffer information may refer to related content that is about the to-be-sent data and buffered by the terminal in advance.

To resolve a problem of a hidden terminal and avoid losing information sent by a terminal, after receiving the UMA of the network side device, the terminal that needs to send data may further send a request to send (RTS) frame that responds to the UMA to the network side device. To avoid a case in which multiple terminals independently send RTS frames, which causes extremely high overheads, the terminal that needs to send data may simultaneously send an RTS frame that has same content, a same modulation manner, and a same physical waveform, thereby effectively suppressing the problem of a hidden terminal.

No matter which manner is used to send the RTS frame, because the buffer information of various terminals is different, the buffer information needs to be sent at different time. The buffer information may also be simultaneously sent in a multi-antenna multi-stream manner, which is not limited to the embodiments described herein.

In a WLAN system, a terminal that needs to send data may send an RTS frame and/or buffer information after a short interframe space (SIFS) or a time interval.

103. Determine, according to the buffer information, scheduling information for establishing UL MU-MIMO.

The scheduling information may be obtained according to the sending level and the data sending length of the to-be-sent data and in the buffer information. The scheduling information may include an allowed sending time length, an allowed sending rate, frequency band information, and the like. That is, the scheduling information specifies which terminals perform data sending at what time in which frequency band according to which sending rate value.

104. Select, from the terminal that needs to send data, a terminal that is allowed to send data, and send, to the terminal that is allowed to send data, a clear to send frame that carries the scheduling information, so that the terminal that is allowed to send data synchronously sends the to-be-sent data according to the scheduling information.

The network side device may determine, according to the buffer information fed back by the terminal that needs to send data, which terminals are allowed to send data, which may be determined according to information such as a level of the to-be-sent data, time for waiting in a queue, and a length of the to-be-sent data, and may select a terminal of a relatively high level to send data. The network side device may unicast, multicast, or broadcast a clear to send (CTS) frame to the terminal that is allowed to send data.

After receiving the CTS frame, the terminal that is allowed to send data may synchronously send the to-be-sent data according to the scheduling information, so that UL MU-MIMO may be implemented.

After receiving the to-be-sent data sent by the terminal that is allowed to send data, the network side device may further unicast, multicast, or broadcast an Acknowledgement (ACK) data packet to the terminal that is allowed to send data, so as to respond to the terminal that is allowed to send data. A multicast manner may be used to reduce signaling interworking for acknowledging data one by one. Certainly, an acknowledgement manner involved in the embodiments of the present disclosure is not limited to the acknowledgement manner described herein.

In this embodiment, after a network side device broadcasts a UMA, a terminal that needs to send data may directly feed back the buffer information that includes a sending level and a data sending length of to-be-sent data. Therefore, the network side device may determine, according to the buffer information, scheduling information and a terminal that is allowed to send data, and send, to the terminal that is allowed to send data, a CTS frame that carries the scheduling information. The terminal directly feeds back the buffer information that includes the sending level and the data sending length of the to-be-sent data, and there is no need to perform multiple times of signaling interworking, so that signaling interworking in a UL MU-MIMO establishment process is reduced. Therefore, resource overheads are reduced, and data sending efficiency may be improved.

An encoding manner of terminal feedback information is:

The buffer information sent by the terminal that needs to send data may be specifically encoded and sent according to a preset information format, where the preset information format includes at least a sending level field and a data length field.

The sending level field occupies two or more bits. When occupying two bits, the sending level field may indicate data of four basic sending levels (that is, four levels of 00, 01, 10, and 11). Certainly, a quantity of bits occupied by the sending level field may be set according to an actual sending level requirement.

The data length field is used to indicate a size of to-be-sent data. Because a data sending length may vary, a quantity of bits of the data length field should cover a maximum data length. To save resources and avoid resource waste caused by a relatively large data length field but a relatively small actually sent data, the terminal may perform data encoding on the to-be-sent data when sending the to-be-sent data, where the data length field only stores an encoded value, so that the quantity of bits occupied by the data length field may be reduced, and resources are saved.

The data encoding manner may be notified to the terminal by the network side device, and the terminal is requested to perform encoding according to the data encoding manner; or the terminal performs encoding according to a data encoding manner and feeds back the data encoding manner to the network side device.

The buffer information may further indicate data indication information and a backoff timer value, where the data indication information is used to indicate whether the terminal needs to send data, and the backoff timer value specifies, when a data conflict occurs, time for waiting to send data. The network side device may specifically determine, from the terminal that needs to send data and according to the backoff timer value and the sending level of the to-be-sent data, the terminal that is allowed to send data.

Therefore, the preset information format may further include a data indication field and a backoff timer value field.

Table 1 below shows a possible implementation manner of the preset information format.

| Data indication field | Sending level field | Data length field | Backoff timer value field |
|---|---|---|---|

The preset information format may be sent to the terminal by the network side device, and may be carried when the UMA is broadcast, or may be separately sent to the terminal To further reduce signaling interworking, different terminals that need to send data may synchronously send the buffer information and/or the RTS frame, so that the network side device may synchronously receive the buffer information and/or the RTS frame sent by different terminals that need to send data.

The UMA sent by the network side device may carry a sending parameter, and the terminal that needs to send data may send the buffer information and/or the RTS frame according to the sending parameter, so as to ensure synchronous sending with another terminal that needs to send data. For example, the sending parameter specifies a sending time or the like for feeding back the buffer information and/or the RTS frame.

Certainly, in another possible implementation manner, the terminal may use a manner of Orthogonal Frequency Division Multiple Access OFDMA) to send the buffer information and/or the RTS frame. That is, the terminal sends the buffer information and/or the RTS frame in a corresponding OFDMA resource block. The network side device may synchronously receive, in different OFDMA resource blocks, information sent by different terminals.

To further save resources, the terminal may send the buffer information and/or the RTS frame in an orthogonal sequence, a quasi-orthogonal sequence, or a Code Division Multiple Access (CDMA) sequence in the corresponding OFDMA resource block. Therefore, the network side device may receive, in one OFDMA resource block, the buffer information and/or the RTS frame sent by different terminals, so that resource overheads may be reduced.

The OFDMA resource block and/or the orthogonal sequence, the quasi-orthogonal sequence, or the CDMA sequence that are/is used by the terminal may be allocated by the network side device. Resource allocation information of the network side device may be carried in the UMA to be notified to each terminal, or the resource allocation information may be separately sent to the terminal that has a data feedback request.

After receiving the buffer information, the network side device may further adjust a size of the OFDMA resource block according to precision of the buffer information, so as to ensure normal data sending and avoid resource waste. The precision of the buffer information may specifically refer to a size of the buffer information.

Figure 2:
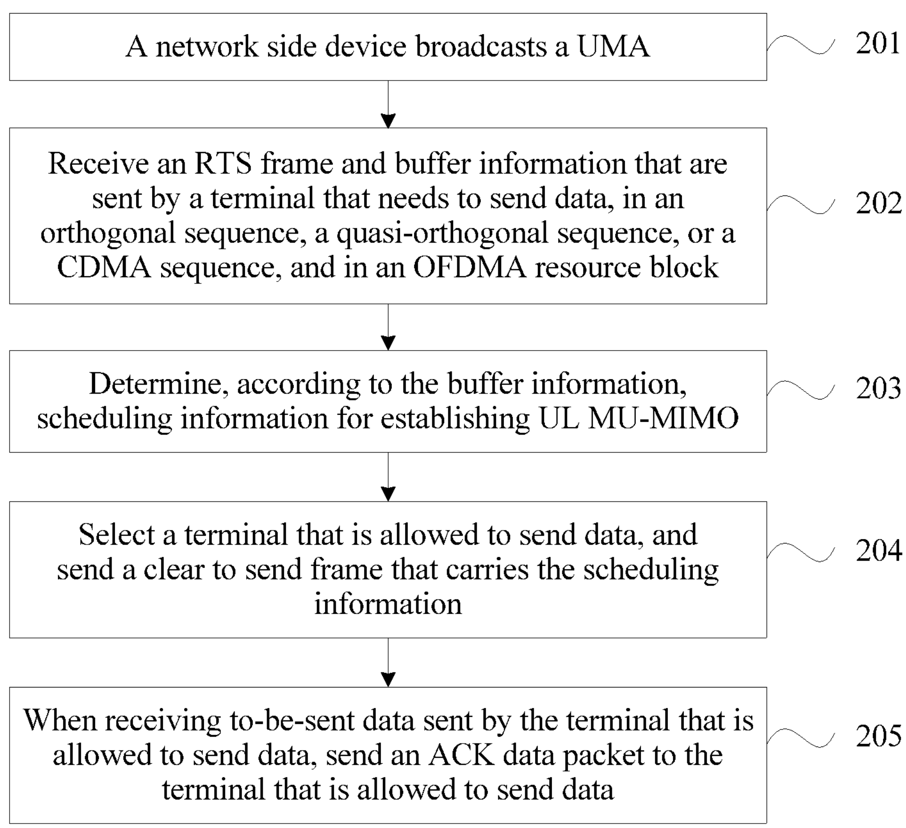
FIG. 2 is a flowchart of an uplink multi-user multi-input multi-output establishment method according to another embodiment of the disclosure.

As shown in FIG. 2, which is a flowchart of a UL MU-MIMO establishment method according to another embodiment of the disclosure, the method may include the following several operations:

201. A network side device broadcasts a UMA.

202. Receive buffer information sent by a terminal that needs to send data, in an orthogonal sequence, a quasi-orthogonal sequence, or a CDMA sequence, and in an OFDMA resource block allocated by the network side device.

The buffer information includes at least a sending level and a data sending length of to-be-sent data, and may further include information such as data indication information and a backoff timer value.

The OFDMA resource block allocated by the network side device, and resource allocation information of any one of the orthogonal sequence, the quasi-orthogonal sequence, or the CDMA sequence may be carried in the UMA to be sent.

A manner of the orthogonal sequence, the quasi-orthogonal sequence, or the CDMA sequence is used to simultaneously feed back, in a same time frequency resource, the buffer information to the network side device.

The present disclosure works in an unlicensed frequency spectrum, and there is a problem of a hidden terminal. Therefore, the terminal that needs to send data may send an RTS frame before feeding back the buffer information, so as to protect subsequent data from being interfered by the hidden terminal To reduce overheads, a feasible manner in which the terminal that needs to send data feeds back the RTS frame is that the terminal that needs to send data simultaneously sends a same RTS frame, so as to protect UL MU-MIMO sending. A traditional RTS frame carries a source address and a destination address. In this embodiment, the source address may use a same default address, or may be specified by the network side device. A manner of determining the source address is not limited in the present disclosure. The destination address is a network side device address. Information such as NAV length information in the RTS frame may be agreed in advance with the network side device. The terminal may obtain the information by using the UMA, or may obtain the information from other broadcast or multicast information of a network layer.

203. Determine, according to the buffer information, scheduling information for establishing UL MU-MIMO.

204. Send, to a terminal that is allowed to send data and selected from the terminal that needs to send data, a clear to send frame that carries the scheduling information, so that the terminal that is allowed to send data sends to-be-sent data according to the scheduling information.

The network side device may use a manner of unicast, multicast, or broadcast to send, to the terminal that is allowed to send data, the clear to send frame that carries the scheduling information.

A multicast manner may be used to further reduce signaling interworking and resource overheads.

205. When receiving the to-be-sent data sent by the terminal that is allowed to send data, send an ACK data packet to the terminal that is allowed to send data.

The network side device may use the manner of unicast, multicast, or broadcast to send the ACK data packet.

The ACK data packet is used to notify the terminal that is allowed to send data that the network side device has succeeded in receiving the data sent by the terminal that is allowed to send data.

In this embodiment, after a network side device broadcasts a UMA, a terminal that needs to send data may feed back, in an OFDMA resource block allocated by the network side device, buffer information that includes a sending level and a data sending length of to-be-sent data. Therefore, the network side device may determine, according to the buffer information, scheduling information and a terminal that is allowed to send data, and send, to the terminal that is allowed to send data, a CTS frame that carries the scheduling information. The terminal directly feeds back the buffer information that includes the sending level and the data sending length of the to-be-sent data, and there is no need to perform multiple times of signaling interworking. Therefore, signaling interworking in a UL MU-MIMO establishment process is reduced, resource overheads are reduced, and data sending efficiency may be improved.

The UMA may further carry requirement information, and the terminal may only feed back, according to the requirement information, buffer content that is corresponding to the requirement information and in the buffer information.

The network side device receives the buffer content that is corresponding to the requirement information and in the buffer information, and may further request, according to an actual situation, the terminal to send other buffer content in the buffer information.

That is, sending of buffer content included in the buffer information may be completed once, or may be completed by multiple times of sending. Therefore, corresponding buffer content requested by the network side device may be fed back each time according to an information requirement scheduled by the network side device, so that system overheads may be reduced, and scheduling may be flexibly performed.

The RTS frame may carry a second NAV value, where the second NAV value specifies a time length that needs to be occupied to send the RTS frame and the buffer information. After receiving the second NAV value, all devices unrelated to the UL MU-MIMO sending perform no other service processing in the time length specified by the second NAV value, so that a processing process of the RTS frame and the buffer information may be protected.

It may also be that the second NAV value specifies a time length that needs to be occupied to send the RTS frame, the buffer information, UL MU-MIMO data, and the ACK data packet. After receiving the second NAV value, all devices unrelated to the UL MU-MIMO sending perform no other service processing in the time length specified by the second NAV value, so that a processing process of the RTS frame, the buffer information, the UL MU data, and the ACK data packet may be protected.

Similarly, a CTS frame sent by the network side device may carry a third NAV value, where the third NAV value specifies a time length that needs to be occupied to send the CTS frame. After receiving the CTS frame, the terminal performs, according to the third NAV value, no other service processing in the time length specified by the third NAV value, so as to protect a processing process of the CTS frame.

Figure 3:
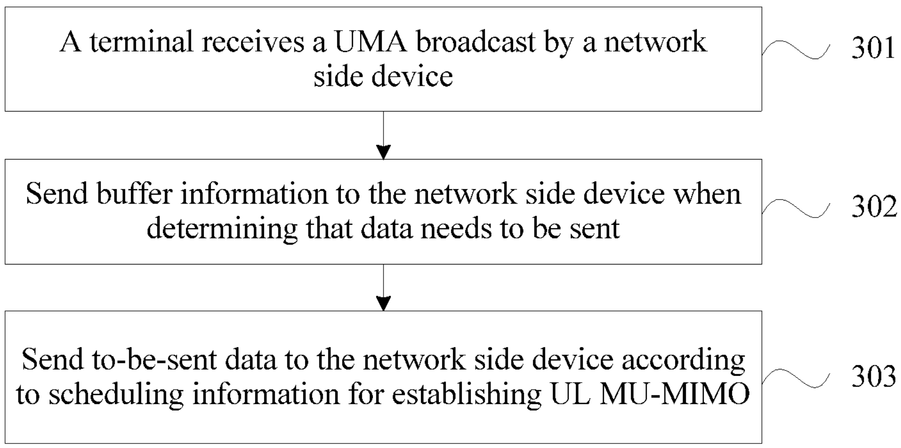
FIG. 3 is a flowchart of an uplink multi-user multi-input multi-output establishment method according to another embodiment of the disclosure.

FIG. 3 is a flowchart of a UL MU-MIMO establishment method according to another embodiment of the disclosure, where the method may include the following several operations:

301. A terminal receives a UMA broadcast by a network side device.

302. Send buffer information to the network side device when determining that data needs to be sent, where the buffer information includes at least a sending level and a data sending length of to-be-sent data.

When determining that data needs to be sent, the terminal may further send an RTS frame to the network side device. A problem of a hidden terminal may be resolved by sending the RTS frame, so that information loss is avoided.

The RTS frame and the buffer information may be simultaneously sent, or may be sent at different time.

The terminal may specifically send the buffer information and/or the RTS frame to the network side device according to a sending parameter sent by the network side device, so as to ensure that the terminal and another terminal may simultaneously send their respective buffer information and/or RTS frames. Therefore, the network side device may simultaneously receive RTS frames and/or buffer information sent by different terminals that need to send data. For example, the sending parameter specifies a sending time or the like for feeding back the buffer information and/or the RTS frame.

In a possible implementation manner, when determining that data needs to be sent, the terminal may specifically send the buffer information in an Orthogonal Frequency Division Multiple Access OFDMA resource block allocated by the network side device.

In another possible implementation manner, when determining that data needs to be sent, the terminal may specifically send the buffer information in an orthogonal sequence, a quasi-orthogonal sequence, or a Code Division Multiple Access CDMA sequence and in an Orthogonal Frequency Division Multiple Access OFDMA resource block allocated by the network side device.

303. When receiving a CTS frame that carries scheduling information for establishing UL MU-MIMO and is sent by the network side device, send the to-be-sent data to the network side device according to the scheduling information, where the scheduling information is determined by the network side device according to the buffer information.

After receiving the buffer information, the network side device may determine, according to buffer content in the buffer information, the scheduling information for establishing UL MU-MIMO, and then may send, to a terminal that is allowed to send data, the CTS frame that carries the scheduling information.

If the terminal receives a CTS frame multicast by the network side device, the terminal sends the to-be-sent data according to the scheduling information, so that UL MU-MIMO establishment may be implemented.

In this embodiment, a terminal receives a UMA broadcast by a network side device, and when determining that data needs to be sent, feeds back buffer information that includes a sending level and a data sending length of to-be-sent data to the network side device. The network side device may determine scheduling information according to the buffer information, select a terminal that is allowed to send data, and multicast a CTS frame that carries the scheduling information. There is no need to respond to each terminal one by one, and a uniform response may be made, so that signaling interworking is reduced. After receiving the CTS frame, the terminal may send the to-be-sent data according to the scheduling information, so as to implement UL MU-MIMO establishment. The terminal directly feeds back the buffer information that includes the sending level and the data sending length of the to-be-sent data, and there is no need to perform multiple times of signaling interworking, so that signaling interworking in a UL MU-MIMO establishment process is further reduced, resource overheads are reduced, and data sending efficiency may be improved.

Figure 4:
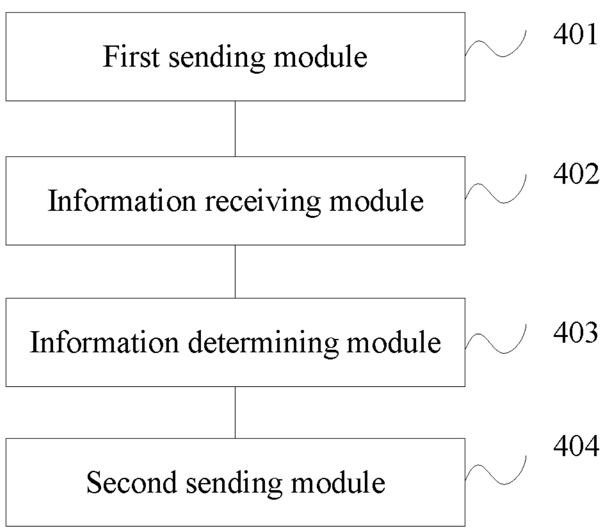
FIG. 4 is a schematic structural diagram of an uplink multi-user multi-input multi-output establishment apparatus according to an embodiment of the disclosure.

FIG. 4 is a schematic structural diagram of a UL MU-MIMO establishment apparatus according to an embodiment of the disclosure, where the apparatus is specifically applied to a network side device. The apparatus may include a first sending module 401, an information receiving module 402, an information determining module 403, and a second sending module 404.

The first sending module 401 is configured to broadcast a UMA.

The information receiving module 402 is configured to receive buffer information sent by a terminal that needs to send data.

The UMA is used to initiate uplink multi-user access, and is a start of the uplink multi-user access.

The UMA may carry a first network allocation vector (NAV) value, where the first NAV value specifies a time length that needs to be occupied to send the UMA. After receiving the UMA, a terminal performs, according to the first NAV value, no other service processing in the time length specified by the first NAV value, so as to protect a processing process of the UMA.

The UMA may further carry an application identifier (AID) of the network side device, feedback location information, and the like.

After receiving the UMA, the terminal may determine whether data needs to be sent, and may send buffer information to the network side device if data needs to be sent.

The buffer information includes at least a sending level and a data sending length of to-be-sent data.

The information determining module 40 is configured to determine, according to the buffer information, scheduling information for establishing UL MU-MIMO.

The second sending module 404 is configured to select, from the terminal that needs to send data, a terminal that is allowed to send data, and send, to the terminal that is allowed to send data, a clear to send frame that carries the scheduling information, so that the terminal that is allowed to send data sends the to-be-sent data according to the scheduling information.

The second sending module 404 may unicast, multicast, or broadcast a clear to send (CTS) frame to the terminal that is allowed to send data.

After receiving the CTS frame, the terminal that is allowed to send data may synchronously send the to-be-sent data according to the scheduling information, so that UL MU-MIMO may be implemented.

After receiving the to-be-sent data sent by the terminal that is allowed to send data, the network side device may further unicast, multicast, or broadcast an Acknowledgement (ACK) data packet to the terminal that is allowed to send data, so as to respond to the terminal that is allowed to send data. A multicast manner may be used to reduce signaling interworking for acknowledging data one by one. Certainly, an acknowledgement manner involved in the embodiments of the present disclosure is not limited to the acknowledgement manner described herein.

In this embodiment, after a UMA is broadcast, a terminal that needs to send data may directly feed back buffer information that includes a sending level and a data sending length of to-be-sent data. Therefore, scheduling information and a terminal that is allowed to send data may be determined according to the buffer information, and a CTS frame that carries the scheduling information may be sent to the terminal that is allowed to send data. The terminal directly feeds back the buffer information that includes the sending level and the data sending length of the to-be-sent data, and there is no need to perform multiple times of signaling interworking, so that signaling interworking in a UL MU-MIMO establishment process is reduced. Therefore, resource overheads are reduced, and data sending efficiency may be improved.

To resolve a problem of a hidden terminal and avoid losing information sent by a terminal, after receiving the UMA of the network side device, the terminal that needs to send data may further send an RTS frame that responds to the UMA to the network side device. To avoid a case in which multiple terminals independently send RTS frames, which causes extremely high overheads, the terminal that needs to send data may simultaneously send an RTS frame that has same content, a same modulation manner, and a same physical waveform, thereby effectively suppressing the problem of a hidden terminal.

The terminal that needs to send data may specifically send the RTS frame before feeding back the buffer information.

Therefore, the information receiving module 402 may further be configured to receive the RTS frame sent by the terminal that needs to send data.

No matter which manner is used to send the RTS frame, because buffer information of various terminals is different, the buffer information needs to be sent at different time. The buffer information may also be simultaneously sent in a multi-antenna multi-stream manner, which is not limited in the present disclosure.

In a WLAN system, a terminal that needs to send data may send an RTS frame and/or buffer information after a short interframe space (SIFS) or a time interval.

To reduce overheads, a feasible manner in which the terminal that needs to send data feeds back the RTS frame is that the terminal that needs to send data simultaneously sends a same RTS frame, so as to protect UL MU-MIMO sending. A traditional RTS frame carries a source address and a destination address. In an embodiment, the source address may use a same default address, or may be specified by the network side device. A manner of determining the source address is not limited in the present disclosure. The destination address is a network side device address. Information such as NAV length information in the RTS frame may be agreed in advance with the network side device. The terminal may obtain the information by using the UMA, or may obtain the information from other broadcast or multicast information of a network layer.

To further reduce signaling interworking, different terminals that need to send data may synchronously send the buffer information and/or the RTS frame, so that the information receiving module may synchronously receive the buffer information and/or the RTS frame sent by different terminals that need to send data.

Therefore, the information receiving module 402 is specifically configured to receive the buffer information synchronously sent by the terminal that needs to send data.

To ensure that different terminals that need to send data may synchronously send the buffer information and/or the RTS frame, in a possible implementation manner, the sent UMA may carry a sending parameter, and the terminal that needs to send data may send the buffer information and/or the RTS frame according to the sending parameter, so as to ensure synchronous sending with another terminal that needs to send data. For example, the sending parameter specifies a sending time or the like for feeding back the buffer information and/or the RTS frame.

In another possible implementation manner, the terminal may use a manner of Orthogonal Frequency Division Multiple Access (OFDMA) to send the buffer information and/or the RTS frame. That is, the terminal sends the buffer information and/or the RTS frame in a corresponding OFDMA resource block.

Therefore, the information receiving module 402 is specifically configured to receive the buffer information sent by the terminal that needs to send data and in an allocated OFDMA resource block.

The information receiving module may synchronously receive, in different OFDMA resource blocks, information sent by different terminals.

To further save resources, the terminal may send the buffer information and/or the RTS frame in an orthogonal sequence, a quasi-orthogonal sequence, or a Code Division Multiple Access (CDMA) sequence in the corresponding OFDMA resource block.

The information receiving module 402 is specifically configured to receive the buffer information sent by the terminal that needs to send data, in an orthogonal sequence, a quasi-orthogonal sequence, or a CDMA sequence, and in an allocated OFDMA resource block.

The information receiving module may receive, in one OFDMA resource block, the buffer information and/or the RTS frame sent by different terminals, so that resource overheads may be reduced.

The OFDMA resource block and/or the orthogonal sequence, the quasi-orthogonal sequence, or the CDMA sequence that are/is used by the terminal may be allocated by the network side device. Resource allocation information of the network side device may be carried in the UMA to be notified to each terminal, or the resource allocation information may be separately sent to the terminal that has a data feedback request.

After receiving the buffer information, the network side device may further adjust a size of the OFDMA resource block according to precision of the buffer information, so as to ensure normal data sending and avoid resource waste. The precision of the buffer information may specifically refer to a size of the buffer information.

The RTS frame may carry a second NAV value, where the second NAV value specifies a time length that needs to be occupied to send the RTS frame and the buffer information. After receiving the second NAV value, all devices unrelated to the UL MU-MIMO sending perform no other service processing in the time length specified by the second NAV value, so that a processing process of the RTS frame and the buffer information may be protected.

It may also be that the second NAV value specifies a time length that needs to be occupied to send the RTS frame, the buffer information, UL MU-MIMO data, and the ACK data packet. After receiving the second NAV value, all devices unrelated to the UL MU-MIMO sending perform no other service processing in the time length specified by the second NAV value, so that a processing process of the RTS frame, the buffer information, the UL MU data, and the ACK data packet may be protected.

Similarly, a multicast CTS frame sent by the second sending module may carry a third NAV value, where the third NAV value specifies a time length that needs to be occupied to send the CTS frame. After receiving the CTS frame, the terminal performs, according to the third NAV value, no other service processing in the time length specified by the third NAV value, so as to protect a processing process of the CTS frame.

The UL MU-MIMO establishment apparatus described in the foregoing embodiments may be integrated into a network side device in a practical application. A network device on which the UL MU-MIMO establishment apparatus in the embodiment of the disclosure is deployed may quickly and efficiently implement control of an application program and reduce tedious operation steps, thereby reducing signaling interworking in a UL MU-MIMO establishment process. Therefore, resource overheads are reduced, and data sending efficiency may be improved.

Figure 5:
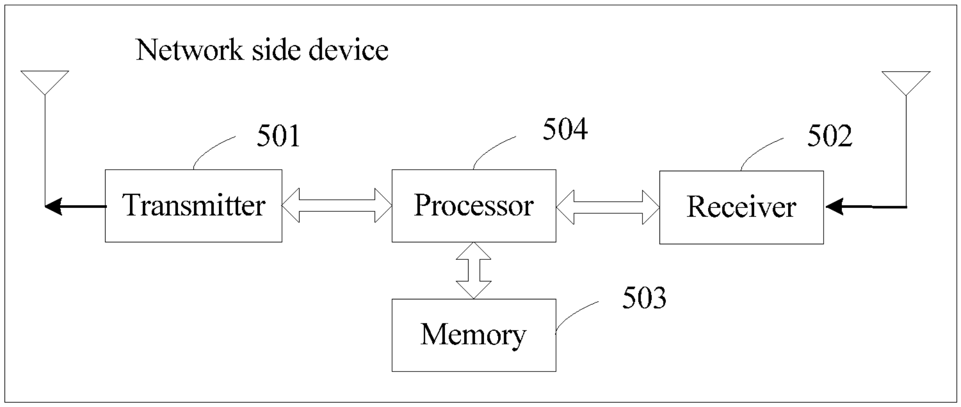
FIG. 5 is a schematic structural diagram of a network side device according to an embodiment of the disclosure.

It may be learned from the foregoing description that, a person skilled in the art may clearly understand that the embodiments of the disclosure may be implemented by using software in addition to a universal hardware platform. Therefore, referring to FIG. 5, an embodiment of the disclosure further provides a network side device, where the network side device includes at least a transmitter 501, a receiver 502, a memory 503, and a processor 504.

The memory 503 stores a set of program instructions. The memory may be a high-speed RAM memory, or may be a non-volatile memory, such as at least one magnetic disk memory.

The processor 504 is configured to invoke the program instructions stored in the memory 503, so as to execute the following operations:

broadcasting an uplink data sending announcement by using the transmitter 501;

receiving, by using the receiver 502, buffer information sent by a terminal that needs to send data, where the buffer information includes at least a sending level and a data sending length of to-be-sent data; and determining, according to the buffer information, scheduling information for establishing uplink multi-user multi-input multi-output; and selecting, from the terminal that needs to send data, a terminal that is allowed to send data, and sending, by using the transmitter 501 to the terminal that is allowed to send data, a clear to send frame that carries the scheduling information, so that the terminal that is allowed to send data sends the to-be-sent data according to the scheduling information.

The processor may be a central processing unit CPU, or an application specific integrated circuit (ASIC), or one or more integrated circuits configured to implement this embodiment of the present disclosure.

Figure 6:
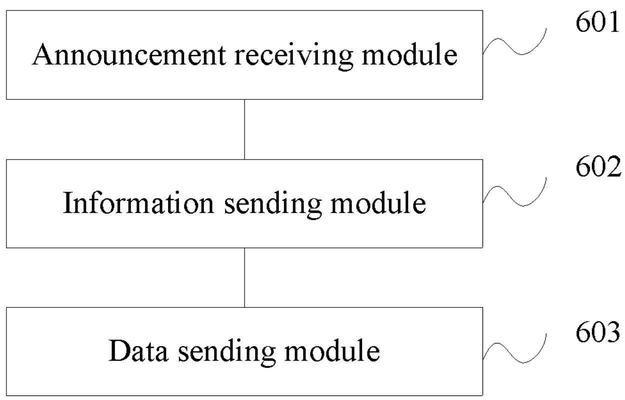
FIG. 6 is a schematic structural diagram of an uplink multi-user multi-input multi-output establishment apparatus according to an embodiment of the disclosure.

FIG. 6 is a schematic structural diagram of another embodiment of a UL MU-MIMO establishment apparatus according to an embodiment of the disclosure, where the apparatus is specifically applied to a terminal. The apparatus may include:

an announcement receiving module 601, configured to receive a UMA sent by a network side device;

an information sending module 602, configured to send buffer information to the network side device when determining that data needs to be sent, where the buffer information includes at least a sending level and a data sending length of to-be-sent data; and a data sending module 603, configured to: when receiving a clear to send frame that carries scheduling information and is sent by the network side device, send the to-be-sent data to the network side device according to the scheduling information, where the scheduling information is determined by the network side device according to the buffer information.

When determining that data needs to be sent, the information sending module may further send an RTS frame to the network side device. A problem of a hidden terminal may be resolved by sending the RTS frame, so that information loss is avoided.

The RTS frame and the buffer information may be simultaneously sent, or may be sent at different time.

To ensure that the terminal and another terminal may simultaneously send their respective buffer information, in a possible implementation manner, the information sending module may specifically send the buffer information to the network side device according to a sending parameter sent by the network side device, so that the network side device may simultaneously receive RTS frames and/or buffer information sent by different terminals that need to send data. For example, the sending parameter specifies a sending time or the like for feeding back the buffer information.

In another possible implementation manner, when determining that data needs to be sent, the information sending module may specifically send the buffer information in an Orthogonal Frequency Division Multiple Access OFDMA resource block allocated by the network side device.

In still another possible implementation manner, when determining that data needs to be sent, the information sending module may specifically send the buffer information in an orthogonal sequence, a quasi-orthogonal sequence, or a Code Division Multiple Access CDMA sequence and in an Orthogonal Frequency Division Multiple Access OFDMA resource block allocated by the network side device.

After receiving the buffer information, the network side device may determine, according to buffer content in the buffer information, the scheduling information for establishing UL MU-MIMO, and then may send, to a terminal that is allowed to send data, the CTS frame that carries the scheduling information.

If the terminal that is allowed to send data receives a CTS frame multicast by the network side device, the data sending module may send the to-be-sent data according to the scheduling information, so as to implement UL MU-MIMO establishment.

The buffer information sent by the information sending module may be specifically encoded and sent according to a preset information format. For the preset information format, reference may be made to the description in the method embodiment, and details are not described herein.

In this embodiment, a UMA broadcast by a network side device is received, and when it is determined that data needs to be sent, buffer information that includes a sending level and a data sending length of to-be-sent data is fed back to the network side device. The network side device may determine scheduling information according to the buffer information, select a terminal that is allowed to send data, and multicast a CTS frame that carries the scheduling information. There is no need to respond to each terminal one by one, and a uniform response may be made, so that signaling interworking is reduced. After receiving the CTS frame, the terminal may send the to-be-sent data according to the scheduling information, so as to implement UL MU-MIMO establishment. The terminal directly feeds back the buffer information that includes the sending level and the data sending length of the to-be-sent data, and there is no need to perform multiple times of signaling interworking, so that signaling interworking in a UL MU-MIMO establishment process is further reduced, resource overheads are reduced, and data sending efficiency may be improved.

The UL MU-MIMO establishment apparatus described in the foregoing embodiment shown in FIG. 6 may be integrated into a terminal in practical application. A terminal on which the UL MU-MIMO establishment apparatus in the embodiment of the disclosure is deployed may quickly and efficiently implement control of an application program and reduce tedious operation steps, thereby reducing signaling interworking in a UL MU-MIMO establishment process. Therefore, resource overheads are reduced, and data sending efficiency may be improved.

Figure 7:
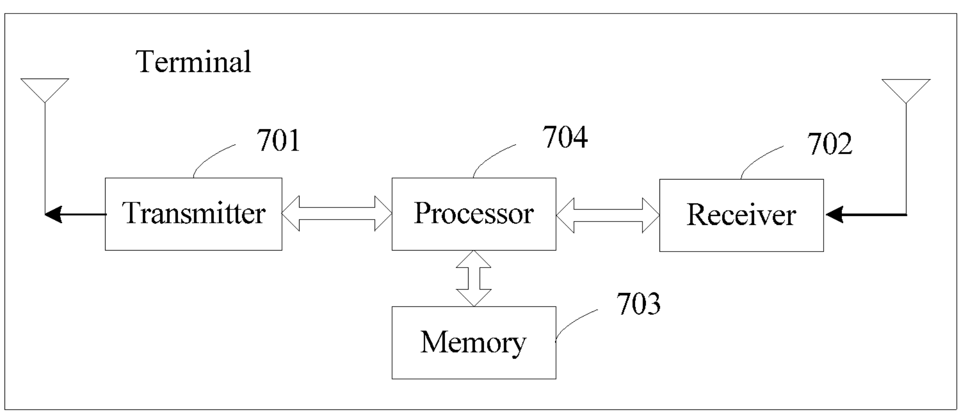
FIG. 7 is a schematic structural diagram of a terminal according to an embodiment of the disclosure.

It may be learned from the foregoing description that, a person skilled in the art may clearly understand that the embodiments of the disclosure may be implemented by using software in addition to a universal hardware platform. Therefore, referring to FIG. 7, an embodiment of the disclosure further provides a terminal, where the terminal includes at least a transmitter 701, a receiver 702, a memory 703, and a processor 704.

The memory 703 stores a set of program instructions. The memory may be a high-speed RAM memory, or may be a non-volatile memory, such as at least one magnetic disk memory.

The processor 704 is configured to invoke the program instructions stored in the memory 703, so as to execute the following operations:

receiving, by using the receiver 702, an uplink data sending announcement sent by a network side device;

sending, by using the transmitter 701, buffer information to the network side device when determining that data needs to be sent, where the buffer information includes at least a sending level and a data sending length of to-be-sent data; and when receiving a clear to send frame that carries scheduling information and is sent by the network side device, sending, by using the transmitter 701, the to-be-sent data to the network side device according to the scheduling information, where the scheduling information is determined by the network side device according to the buffer information.

The processor may be a central processing unit CPU, or an application specific integrated circuit (ASIC), or one or more integrated circuits configured to implement this embodiment of the present disclosure.

The embodiments in this specification are all described in a progressive manner, for same or similar parts in the embodiments, reference may be made to these embodiments, and each embodiment focuses on a difference from other embodiments. The apparatus disclosed in the embodiment is basically similar to the method disclosed in the embodiment, and therefore is described briefly; for related parts, reference may be made to partial descriptions of the method.

This disclosure may be used to enable a person skilled in the art to implement or use the embodiments of the disclosure. Various modifications made to the embodiments will be obvious to a person skilled in the art, and the general principles defined herein may also be implemented in other embodiments without departing from the protection scope of the embodiments of the disclosure. Therefore, the present disclosure is not intended to be limited to these embodiments illustrated herein, but shall be construed in the widest scope consistent with the principles and novel features disclosed herein.

What is claimed is:

1. An uplink multi-user multi-input multi-output communication establishment method, comprising:

broadcasting, by a network side device, an uplink data sending announcement that indicates a start of an uplink multi-user multi-input multi-output communication;

receiving buffer information sent by a first terminal that needs to send data, wherein the buffer information comprises at least a sending level, a data sending length of to-be-sent data and a backoff timer value, wherein the buffer information is sent by a plurality of terminals including the first terminal and a second terminal in response to receiving the broadcast uplink data sending announcement;

determining, according to the buffer information, scheduling information for establishing the uplink multi-user multi-input multi-output communication; and selecting, using the scheduling information, the second terminal that is allowed to send data, wherein the second terminal is selected from the plurality of terminals based at least on the backoff timer value specified in the buffer information and sending, to the second terminal a clear to send frame that carries the scheduling information, so that the second terminal sends the to-be-sent data according to the scheduling information.

2. The method according to claim 1, wherein the receiving buffer information sent by the first terminal comprises:

receiving the buffer information that is synchronously sent by the first terminal and the second terminal.

3. The method according to claim 1, wherein the receiving buffer information sent by the first terminal comprises:

receiving the buffer information that is sent, in an Orthogonal Frequency Division Multiple Access resource block allocated by the network side device, by the first terminal.

4. The method according to claim 1, wherein the receiving buffer information sent by the first terminal comprises:

receiving the butler information that is sent, in one of an orthogonal sequence, a quasi-orthogonal sequence, and a Code Division Multiple Access sequence and in an Orthogonal Frequency Division Multiple Access resource block allocated by the network side device, by the first terminal.

5. The method according to claim 1, wherein after the broadcasting, by the network side device, the uplink data sending announcement, the method further comprises:

receiving a request to send frame sent by the first terminal.

6. An uplink multi-user multi-input multi-output communication establishment method, comprising:

receiving, by a terminal, an uplink data sending announcement broadcast by a network side device that indicates a start of an uplink multi-user multi-input multi-output communication;

sending buffer information to the network side device when determining that data needs to be sent in response to receiving the broadcast uplink data sending announcement, wherein the buffer information comprises at least a sending level, a data sending length of to-be-sent data, and a backoff timer value, wherein the buffer information is sent by the terminal in response to receiving the broadcast uplink data sending announcement; and when receiving a clear to send frame that carries scheduling information and is sent by the network side device, sending the to-be-sent data to the network side device according to the scheduling information, wherein the scheduling information is determined by the network side device according to the buffer information.

7. The method according to claim 6, wherein the sending buffer information to the network side device when determining that data needs to be sent comprises:

when determining that data needs to be sent, sending the buffer information in an Orthogonal Frequency Division Multiple Access resource block allocated by the network side device.

8. The method according to claim 6, wherein the sending buffer information to the network side device when determining that data needs to be sent comprises:

when determining that data needs to be sent, sending the buffer information in one of an orthogonal sequence, a quasi-orthogonal sequence, and a Code Division Multiple Access sequence and in an Orthogonal Frequency Division Multiple Access resource block allocated by the network side device.

9. The method according to claim 6, herein when it is determined that data needs to be sent, the method further comprises:

sending a request to send frame to the network side device.

10. An uplink multi-user multi-input multi-output communication establishment network side device, the network side device comprising:

a transmitter, configured to broadcast an uplink data sending announcement that indicates a start of an uplink multi-user multi-input multi-output communication;

a receiver, configured to receive buffer information sent by a first terminal that needs to send data, wherein the buffer information comprises at least a sending level, a data sending length of to-be-sent data, and a backoff timer value, wherein the receiver is configured to receive the buffer information that is sent by a plurality of terminals including the first terminal and a second terminal in response to receiving the broadcast uplink data sending announcement;

a processor, configured to determine, according to the buffer information, scheduling information for establishing the uplink multi-user multi-input multi-output communication; and wherein the transmitter is farther configured to select, using the scheduling information, a second terminal that is allowed to send data, and to send, to the second terminal, a clear to send frame that carries the scheduling information, so that the second terminal sends the to-be-sent data according to the scheduling information, wherein the second terminal is selected from the plurality of terminals that need to send data based at least on the backoff timer value specified in the buffer information.

11. The network side device according to claim 10, wherein the receiver is further configured to receive the buffer information that is synchronously sent by the first terminal and the second terminal.

12. The network side device according to claim 10, wherein the receiver is further configured to receive the buffer information that is sent, in an Orthogonal Frequency Division Multiple Access resource block allocated b the network side device, by the first terminal.

13. The network side device according to claim 10, wherein the receiver is further configured to receive the buffer information that is sent, in one of an orthogonal sequence, a quasi-orthogonal sequence, and a Code Division Multiple Access sequence and in an Orthogonal Frequency Division Multiple Access resource block allocated by the network side device, by the first terminal.

14. The network side device according to claim 10, wherein the receiver is further configured to receive a request to send frame sent by the first terminal.

15. An uplink multi-user multi-input multi-output communication establishment terminal, the terminal comprising:

a receiver, configured to receive an uplink data sending announcement broadcast by a network side device that indicates a start of an uplink multi-user multi-input multi-output communication;

a transmitter, configured to send buffer information to the network side device when determining that data needs to be sent in response to receiving the broadcast uplink data sending announcement, wherein the buffer information comprises at least a sending level, a data sending length of to-be-sent data, and a backoff timer value, wherein the buffer information is sent by a plurality of terminals in response to receiving the broadcast uplink data sending announcement; and wherein the transmitter is further configured to: when receiving a clear to send frame that carries scheduling information and is sent by the network side device, send the to-be-sent data to the network side device according to the scheduling information, wherein the scheduling information is determined by the network side device according to the buffer information.

16. The terminal according to claim 15, wherein the transmitter is further configured to: when determining that data needs to be sent, send the buffer information in an Orthogonal Frequency Division Multiple Access resource block allocated by the network side device.

17. The terminal according to claim 15, wherein the transmitter is further configured to: when determining that data needs to be sent, send the buffer information in one of an orthogonal sequence, a quasi-orthogonal sequence, and a Code Division Multiple Access sequence and in an Orthogonal Frequency Division Multiple Access resource block allocated by the network side device.

18. The terminal according to claim 15, wherein the transmitter is further configured to send a request to send frame to the network side device when determining that data needs to be sent.

* * * * *